US009275601B2

(12) United States Patent
Kaburlasos et al.

(10) Patent No.: US 9,275,601 B2
(45) Date of Patent: Mar. 1, 2016

(54) TECHNIQUES TO CONTROL FRAME DISPLAY RATE

(71) Applicant: Intel Corporation, Santa Clara, CA (US)

(72) Inventors: Nikos Kaburlasos, Lincoln, CA (US); Eric Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 13/712,397

(22) Filed: Dec. 12, 2012

(65) Prior Publication Data

US 2014/0160136 A1 Jun. 12, 2014

(51) Int. Cl.
*G06F 3/14* (2006.01)
*G09G 5/00* (2006.01)

(52) U.S. Cl.
CPC ............ *G09G 5/00* (2013.01); *G09G 2320/103* (2013.01); *G09G 2330/022* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 6,971,034 | B2 | 11/2005 | Samson et al. | |
| 7,149,909 | B2 | 12/2006 | Cui et al. | |
| 7,222,253 | B2 | 5/2007 | Samson et al. | |
| 7,268,779 | B2 | 9/2007 | Piazza et al. | |
| 7,479,965 | B1 * | 1/2009 | King et al. | 345/589 |
| 7,698,575 | B2 | 4/2010 | Samson | |
| 7,711,864 | B2 | 5/2010 | de Cesare et al. | |
| 7,925,899 | B2 | 4/2011 | Gumma et al. | |
| 8,199,158 | B2 | 6/2012 | Samson et al. | |
| 2002/0075263 | A1 * | 6/2002 | Kato | 345/423 |
| 2003/0012456 | A1 * | 1/2003 | Takeo et al. | 382/295 |
| 2004/0039954 | A1 | 2/2004 | White et al. | |
| 2006/0059494 | A1 | 3/2006 | Wexler et al. | |
| 2007/0242076 | A1 | 10/2007 | Samson et al. | |
| 2009/0027403 | A1 | 1/2009 | Jung | |
| 2009/0096797 | A1 | 4/2009 | Du et al. | |
| 2009/0167770 | A1 | 7/2009 | Navale et al. | |
| 2009/0309885 | A1 * | 12/2009 | Samson et al. | 345/519 |
| 2010/0162006 | A1 | 6/2010 | Therien et al. | |
| 2010/0265344 | A1 * | 10/2010 | Velarde et al. | 348/208.16 |
| 2011/0074800 | A1 * | 3/2011 | Stevens et al. | 345/545 |
| 2011/0075730 | A1 * | 3/2011 | Samuelsson et al. | 375/240.03 |
| 2011/0084971 | A1 * | 4/2011 | Kuo et al. | 345/501 |
| 2011/0109624 | A1 * | 5/2011 | Greenberg et al. | 345/419 |
| 2011/0109796 | A1 * | 5/2011 | Subedar et al. | 348/459 |
| 2012/0110351 | A1 * | 5/2012 | Raju et al. | 713/300 |

FOREIGN PATENT DOCUMENTS

| | | | |
|---|---|---|---|
| JP | 2007-503059 | A | 2/2007 |
| WO | 2005/020157 | A1 | 3/2005 |

OTHER PUBLICATIONS

U.S. Appl. No. 13/669,576, filed Nov. 6, 2012, 23 pages.

(Continued)

*Primary Examiner* — Kee M Tung
*Assistant Examiner* — Yi Wang
(74) *Attorney, Agent, or Firm* — Trop Pruner & Hu, P.C.

(57) ABSTRACT

Techniques to determine when to decrease a frame display rate based in part on the amount or degree of change between sequential frames. The amount or degree of change can be measured based on all or part of similarly located portions of sequential frames. In some cases, power use can be reduced without compromising visual quality by reducing frame display rate when an amount or degree of change between frames is small.

25 Claims, 5 Drawing Sheets

(56) References Cited

OTHER PUBLICATIONS

Office Action received for European Patent Application No. 09251531.1, mailed Apr. 23, 2010, 2 pages.

Office Action received for European Patent Application No. 09251531.1, mailed Nov. 2, 2010, 7 pages.

Office Action received for Korean Patent Application No. 10-2009-51431, mailed Feb. 9, 2011, 9 pages of Korean Office Action, including 4 pages of English translation.

U.S. Appl. No. 12/157,479, filed Jun. 11, 2008, 19 pages.

* cited by examiner

TECHNIQUES TO CONTROL FRAME DISPLAY RATE

TECHNICAL FIELD

The subject matter disclosed herein relates generally to frame display, and more particularly to control of frame display rate.

BACKGROUND ART

In display technology, frame rate represents a rate at which frames are displayed. In a computer system, a graphics engine generally attempts to maximize the display frame rate of frames provided by graphics applications. The maximum possible frame rate for most real-life applications is 60 frames per second (fps). Higher frame rates typically provide higher visual quality to a user. However, higher frame rates typically involve more power use. In systems where power use is to be minimized, such as battery powered devices, conserving power use can be important.

DESCRIPTION OF THE EMBODIMENTS

A higher frame rate does not always provide improved visual quality. A higher frame rate can be used when there are significant or fast changes from one rendered frame to the next. For example, a higher frame rate may provide better visual quality when objects move quickly around a screen. On the other hand, when changes from one frame to the next are smaller or slower, a high frame rate does not necessarily improve the visual experience but can add to power dissipation. When lower frame rates do not degrade the overall visual experience, they may be desirable since they can reduce power dissipation. Platforms that rely on battery power or are otherwise conscious of power use could benefit from reduced power dissipation. For example, lowering the frame rate of a scene which contains relatively slow moving objects from 60 fps to 50 fps may not reduce the overall image quality, as perceived by the user, and can reduce power consumption.

Frame Rate Control (FRC) schemes exist today that allow the user to specify a target frame rate which does not change dynamically over time. Whenever the platform is capable of exceeding the user-specified target frame rate, it instead decreases the frame rate it delivers to match the target and save power. However, today's FRC schemes do not take into account the currently available graphics power budget.

Figure 1:
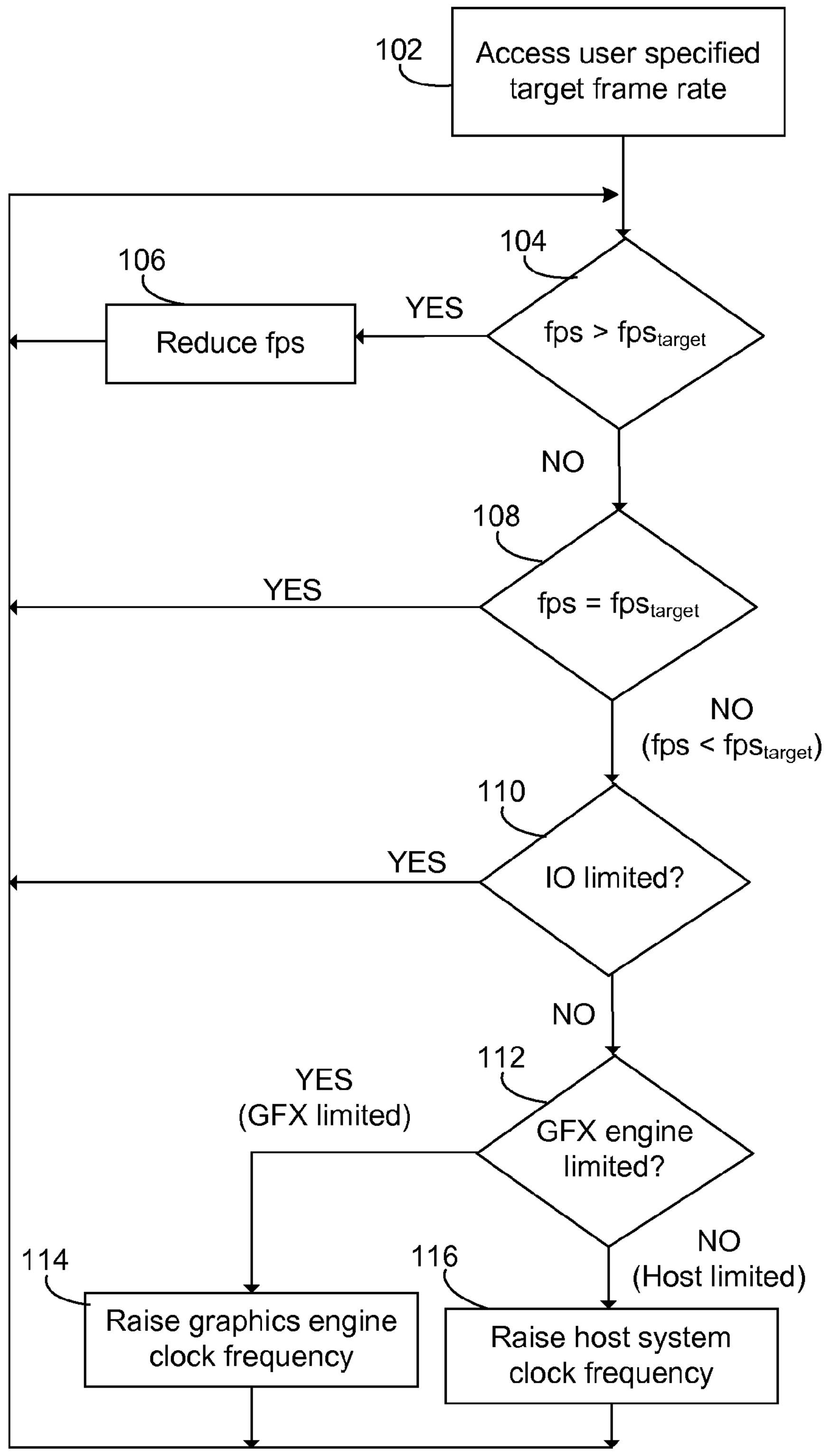
FIG. 1 depicts an example process to set frame rate.

FIG. 1 is a flow diagram of a frame rate control scheme. At block 102, the process accesses a user-specified target frame rate, $fps_{target}$. For example, the user can enter the target frame rate in a data entry field of a user interface. The target frame rate can be equal to or lower than 60 fps and it is often higher than 30 fps. Generally, 30 fps may be considered the lowest frame rate which can provide acceptable visual quality. A graphics engine tries to achieve a frame rate that is, on average, the user-specified target frame rate. The frame rate of frames requested to be displayed by an application that is rendered by the graphics engine may vary over time. The average frame rate (fps), is calculated over a window of time and is compared against the target frame rate $fps_{target}$. If, at a certain point in time, the graphics engine and driver deliver a frame rate higher than the target frame rate, then they lower the current frame rate to the target level, $fps_{target}$ (blocks 104 and 106). The frame rate can be lowered by the driver inserting appropriate delays in between one or more frame drawing requests. A frame can be a portion of a display screen worth of image data, where the portion is all or part of the display screen.

If the current average frame rate is equal to the target frame rate (block 108), then the process ends.

If the current average frame rate is lower than the target frame rate, then either the graphics engine clock frequency or the host system's central processing unit clock frequency may be raised in order to increase the current frame rate to reach the target frame rate. Raising the graphics engine's clock frequency or the central processing unit's clock frequency can take place if the graphics system is not currently IO limited (block 110). IO limitation can involve a limit on data transfer rate between memory and the graphics engine. If the system is IO limited, then raising the clock frequency of the graphics engine or the host system will likely not increase the delivered frame rate. There may be a reduction in power use from lowering the current host or graphics clock frequency or maintaining a lower than target frame rate, until the graphics subsystem stops being IO limited. Metrics are available in the central processing unit package that allow the graphics subsystem to determine whether the application is graphics, host, or IO limited at any point in time.

If the host/graphics system is not IO limited (block 110), then raising the graphics engine clock frequency (block 114) or the host system clock frequency (block 116) can increase the current frame rate to $fps_{target}$. This may also involve a power-budget rebalancing between the host and graphics cores.

Block 112 determines whether the graphics engine is a cause of lower than desired frame rate. For example, if the graphics engine is operating in full active mode over a window of time, the frame rate can be increased by increasing the clock frequency of the graphics engine (block 114). In some systems, a graphics engine state of RC0 signifies full active mode whereas a state of RC6 indicates the graphics engine is inactive and powered down. If the graphics engine has a state of RC0 virtually all of the time during the window of time, then increasing the frequency of clock signal for the graphics engine can be used to increase the frame rate to $fps_{target}$ (block 114).

However, if the graphics engine is not operating in RC0 state (full active mode) 100% of the time, then increasing a frequency of the central processing unit of the host system can increase graphics core utilization (RC0 residency) and bring the delivered frame rate closer to $fps_{target}$ (block 116).

Various embodiments allow the graphics engine, processor, one or more cores, a fixed function device, subsystem or other computing device, circuitry, or machine-executed program to measure the degree of change from one rendered frame to the next and then lower the target frame rate in response to a low degree of change. An advantage, but not a necessary feature of any embodiment, is permitting reduced power consumption from the lowered target frame rate without perceivable degradation or change in visual quality of a rendered graphics workload. In various embodiments, the target frame rate can be increased in response to increased detected degree of change between frames.

Figure 2:
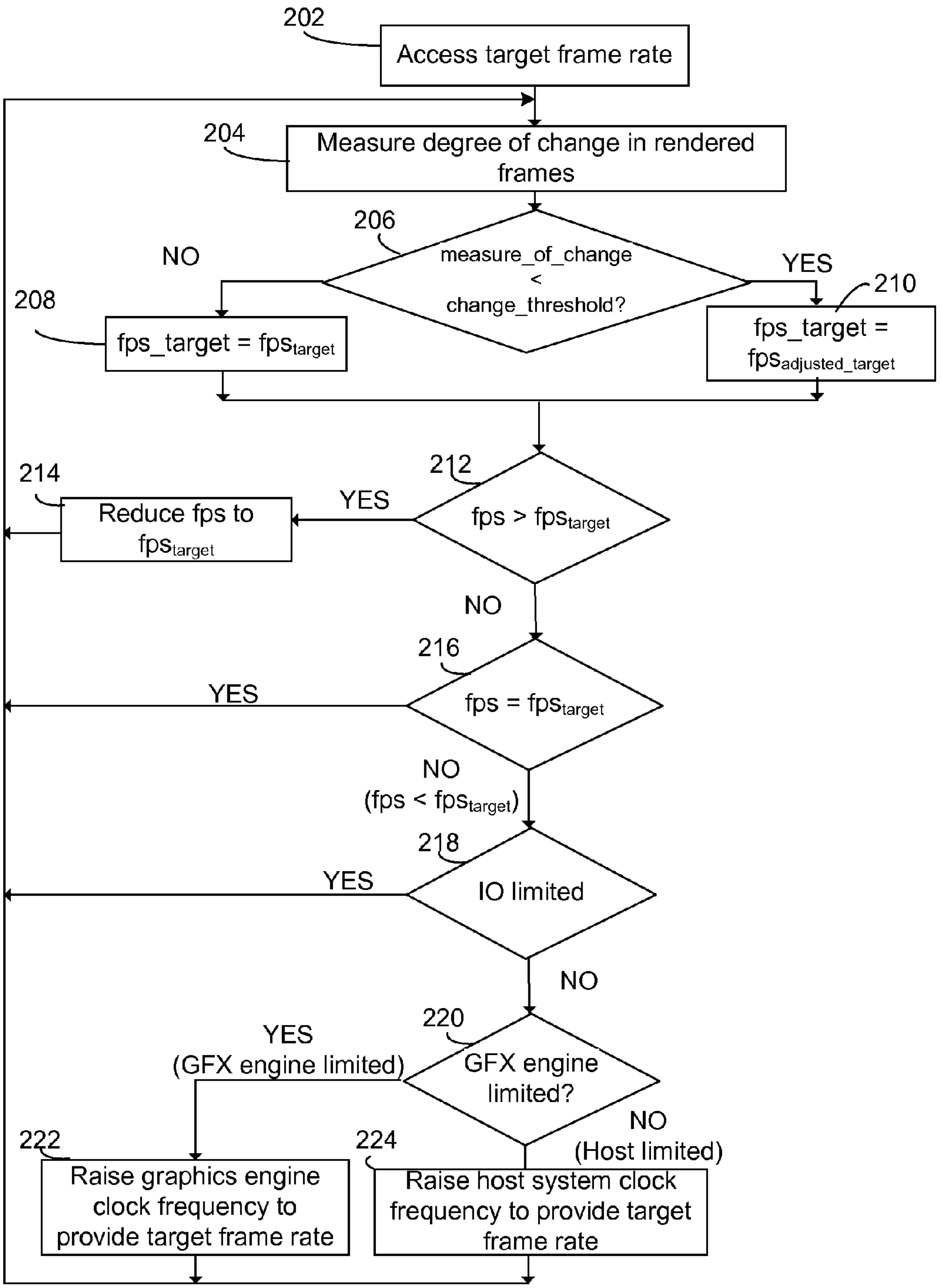
FIG. 2 depicts an example process to set a frame rate based at least in part on a measure of change between portions of frames.

FIG. 2 depicts an example FRC adjustment scheme. In this scheme, the frame rate may not be merely determined based on a user input, such as a user specified target frame rate, $fps_{target}$, but can also be based in part on the degree of change observed in the most recent set of N frames, where N≥2. The process can reduce the target frame rate, relative to the user specified frame rate target, when the measure of change between frames is lower than a threshold. Reducing the target frame rate can reduce power consumption of the graphics engine, central processing unit, or other device that is providing or generating frames for display.

In block 202, a target frame rate, $fps_{target}$, is accessed. The target frame rate can be set by a user in a manner similar to that of block 102 of FIG. 1.

In block 204, the graphics engine determines a measure_of_change that quantifies a degree of change observed in N rendered frames, where N is an integer≥2. A device other than a graphics engine can determine a measure of change. This current measure of change can represent an amount of change between two or more frames. Various manners of determining measure_of_change are described later.

In block 206, for a current frame, a determination is made whether the measure_of_change is less than a change_threshold. If the observed measure_of_change is higher than or equal to the pre-specified threshold change_threshold, then block 208 follows block 206. If the observed measure_of_change is less than the pre-specified threshold change_threshold, then block 210 follows block 206.

The change_threshold can be set to a value such that changes between frames at the current frame rate do not produce visual artifacts to a viewer of the display. The change_threshold is a design choice based on viewer's acceptable video quality. A graphical user interface can be used to provide options on power savings mode and video quality to allow the user to accept lower video quality. When power saving mode selection is available, a viewer can be provided with choices of video quality. For example, the choices can be high, medium, or lower video quality. If the viewer accepts low video quality, the change_threshold can be set to a higher value to allow for more power savings, but with potentially noticeable worse video quality for higher motion scenes. If the viewer accepts a high video quality, the change_threshold can be set to a lower value.

In some cases, a user can be presented with options of low action video, medium action video, and high action video. In programs such as sports or action movies, high action video can be selected. In programs such as talk shows, low action video can be selected. High action video can correspond to a lower value for change_threshold than that used for low action video.

The change_threshold is a flexible parameter which can be determined with post-silicon system characterization. A number of different graphics workloads may be executed on the platform with a range of values for the change_threshold parameter. The largest possible value of this parameter which does not produce unacceptable visual artifacts can be picked and then be programmed in to the graphics device driver or into a configuration register of the graphics engine.

In block 208, for the current frame, if the observed measure_of_change is higher than or equal to the pre-specified threshold change_threshold, then the graphics engine uses the user-specified target frame rate $fps_{target}$ as the target frame rate.

In block 210, if the current measure_of_change is lower than a pre-specified threshold value, change_threshold, then this is an opportunity to lower the target frame rate for the current frame without significantly impacting the visual quality of the rendered stream. A new target frame rate, $fps_{adjusted\_target}$, for the current frame can be determined in the following manner:

$$fps_{adjusted\_target}=fps_{floor}+\text{measure\_of\_change}^*[(fps_{target}-fps_{floor})/\text{measure\_of\_change}_{max}]$$

where:

$fps_{floor}$ is 30 fps, although other values can be used, $fps_{target}$ is a user specified target frame rate, $\text{measure\_of\_change}_{max}$ is the maximum possible value of the measure of change that occurs when all pixels change from one frame to the next but can also be set to a maximum value when a threshold of change between two frames is met or passed, and measure_of_change is the measured level of change between two or more sequential frames.

This approach can be used to reduce the target frame rate below that specified by a user based on the measure of change. When the measure_of_change is a maximum, the target frame rate is set to the user specified frame rate.

Another manner to determine the new target frame rate can be as follows:

$$fps_{adjusted\_target}=fps_{floor}+C^*\text{measure\_of\_change}$$

where, $fps_{floor}$ is 30 fps, although other values can be used and value C can be set so that that when measure_of_change is a minimum value of 0, the adjusted target frame rate is $fps_{floor}$ and when measure_of_change is a maximum, the adjusted target frame rate can be the user specified target frame rate.

Other linear and non-linear relationships between new target frame rate, $fps_{adjusted\_target}$, and measure_of_change can be used.

A look-up-table can be used to determine adjusted target frame rate based on the determined measure_of_change.

The measure_of_change can be measured between entire frames or co-located portions of frames. The measure_of_change can be calibrated to be a value between 0 and 1, where the measure_of_change is a 1 when there is complete change between regions and the measure_of_change is a 0 when there is no change between regions. The measure_of_change can be a maximum value (e.g., 1) when the change is at or greater than a threshold. The measure_of_change can be a minimum value (e.g., 0) when the change is at or less than a threshold.

The $fps_{adjusted\_target}$ can be lowered, but may not be reduced below a certain floor value. The floor value can be 30 fps. A 30 fps is often assumed to be the minimum frame rate that can deliver acceptable quality, however, other floor values can be used. The minimum acceptable frame rate could, of course, be programmable and could be set to a value higher than or lower than 30 fps.

Various manners to determine measure_of_change are described next. In some cases, to determine measure_of_change, a pixel-based Sum of Absolute Differences (SAD) calculation could be used to calculate change from one frame to the next or across a sliding window of an integer M frames. SAD values can be computed for each pair of consecutive frames and summed across all M frames. The computed total SAD value, or $SAD_{total}$, may represent a measure of change. One potential drawback with this approach is that if change is significant or fast but is limited to a small area of each rendered frame, then even though that computed $SAD_{total}$ value may not exceed the predefined change_threshold, there may still be significant enough change in the rendered frames so that reducing the target frame rate may lead to a degradation of visual quality.

Another technique to determine measure_of_change may involve determining a $SAD_{total}$ value across an entire frame and also determining local $SAD_{local}$ values of sub-blocks for each frame. For example, each rendered frame may be divided into K sub-blocks, where K=2, 4, 8, and so forth. Each sub-block can have one or more pixels and be shaped as a square, rectangle, row of pixels, column of pixels, or other shape. A $SAD_{local}$ value can be determined for each pair of sub-blocks which occupy the same positions within two or more consecutive frames. The maximum $SAD_{local,max}$ value across a sliding window of an integer M rendered frames can be identified and in order to proceed to block 210 and reduce the target frame rate, this maximum $SAD_{local,max}$ value may not exceed a predetermined threshold.

Another technique accounts for a scenario where there is not much change in between frames overall but one or more regions within the frames include changes. Such technique can involve determining measure_of_change across M rendered frames as a weighted average of the $SAD_{total}$ as well as determining $SAD_{local,max}$ values for small regions across these M frames. The small regions can be any shape but co-located across these M frames. The following equation can be used to determine measure_of_change:

$$\text{measure\_of\_change}=\text{weight}_1*SAD_{total}+\text{weight}_2*SAD_{local,max} \quad (1)$$

where, values $\text{weight}_1$ and $\text{weight}_2$ can be programmable. The values $\text{weight}_1$, and $\text{weight}_2$ can be programmed based on post-silicon characterization of multiple graphics workloads.

Additional approaches are possible to reduce the calculations of SAD. For example, if the measure_of_change calculated with equation (1) on a frame (relative to the previous frame) has exceeded the change_threshold because of a large $SAD_{local,max}$ on a sub-block somewhere inside the frame, then the measure_of_change calculation can start on the following frame in the vicinity of the same sub-block, because that area in the frame is likelier to continue to have large change or motion and could probably provide enough information to enable a decision to not reduce the target frame rate in block 206. In that case, the SAD calculation does not need to be performed on the entire frame, because a decision may be made quickly and locally, based on one or a few sub-blocks within the frame.

In various embodiments, the measure_of_change may only be determined at times when the frame rate is high, e.g., above 45 fps or 50 fps, so as to not impose the power cost of determining measure_of_change at times when the frame rate is lower and the opportunity to reduce frame rate and save power is also low.

Also, at times when there are significant changes from one frame to the next, the SAD operation will not, in many cases, have to be performed on entire frames. Instead, the SAD determination can stop as soon as enough of it has been performed to determine that the measure_of_change has reached the change_threshold value or at least is high enough to be considered a maximum value. Reaching the change_threshold value means the target frame rate is not to be reduced. At that point, a decision can be made to skip the SAD operation on the rest of the frame. This can save power used to complete SAD determination on an entire frame (or pair of frames).

In an embodiment, the measure_of_change calculation can be done right as or after the graphics processor has completed rendering a current frame in the back buffer. Some systems use a back and front buffer. The front buffer includes frame pixel data that is currently displayed whereas the back buffer has pixel data to be displayed next. In that case, while one or more portions of the back frame are processed by the graphics core, they are cached locally in the graphics core, and before storing them in the back buffer in system memory, portions of the front frame buffer can be read in and compared with the locally cached portions of the back buffer. In other words, the graphics core or graphics processing unit (GPU) stores sections of the frame it renders in a local cache, reads in corresponding sections of the previous frame from memory or front buffer and performs the measure_of_change calculation before the current frame is fully written into main memory or back buffer.

In an implementation, as soon as GPU or graphics core completes writing a rendered frame to the back frame buffer, the GPU or graphics core can read the frame from the back frame buffer and compare the frame to a frame in front frame buffer.

In various embodiments, the SAD calculations can be done quickly, efficiently, and with a low power use which does not add much to the overall power dissipation of the graphics core. A fixed-function implementation of SAD operations can be used. A graphics engine can use low-power fixed-function support for SAD type of operations that are often also used for video analytics, gesture recognition, and so forth. Accordingly, processing used for a different purpose can also be used to adjust the target frame rate. Performing a SAD calculation on pairs of frames may not add more than a few tens of mill watts of CPU/GPU package power dissipation, on top of the power that the CPU/GPU package would normally dissipate, as it renders graphics frames.

Blocks 212-224 correspond to respective blocks 104-116 of FIG. 1. The target frame rate can be the user specified rate (block 208) or the adjusted target frame rate (block 210). The frame rate for the current frame can be set to the target frame rate if the current frame rate exceeds the target frame rate. The frame rate for the current frame can be set to the target frame rate if the current frame rate is less than the target frame rate.

Figure 3:
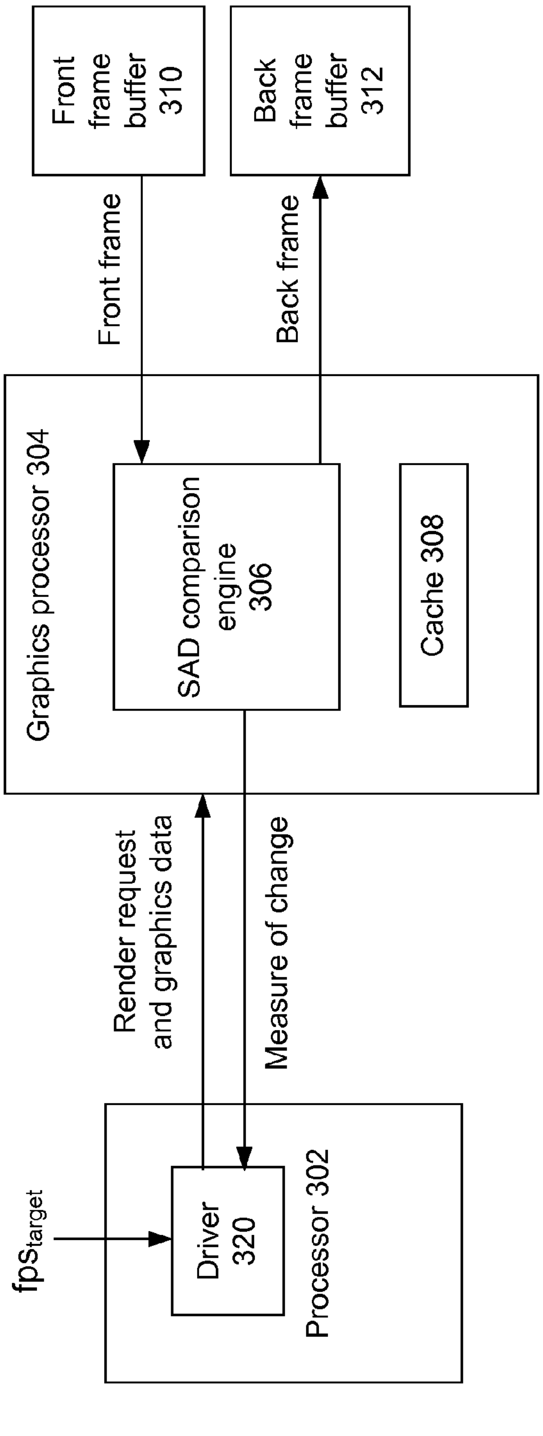
FIG. 3 depicts an example system that can used to control frame rate.

FIG. 3 depicts an example embodiment that determines a frame rate based in part on a measure of change between frames.

Processor 302 executes a driver 320. Driver 320 can access a target frame rate, $fps_{target}$, from a register or memory. The target frame rate can be specified by a user or viewer of content.

Driver 320 can request graphics processor 304 to render one or more images by providing request to render the graphics data for subsequent display and corresponding graphics data (or a pointer to the graphics data).

Graphics processor 304 performs operations at least related to graphics pipeline processing of images. Graphics processor 304 can include or access a separate SAD comparison engine 306. SAD comparison engine 306 can determine a difference between frames. For example, SAD comparison engine 306 can determine a measure of change between any portion or entirety of frames in a manner described earlier with regard to FIG. 2. The portions of the two frames that are compared can be co-located or located in the same pixel coordinate regions. SAD comparison engine 306 can be implemented as a fixed function or operation device or software-programmable computer.

Front frame buffer 310 can store a frame that is being displayed. Back frame buffer 312 can store a frame that is to be displayed after the frame stored in front frame buffer 310. Front frame buffer 310 and back frame buffer 312 can be in main memory. A first frame of the compared frames can be a frame generated by graphics processor 304. A portion or entirety of the first frame can be accessed from cache 308. A portion or entirety of a second frame of the compared frames can be retrieved from front frame buffer 310. SAD comparison engine 306 can request a direct memory access (DMA) transfer of the first frame generated by graphics processor 304 to back frame buffer 312.

SAD comparison engine 306 can provide the determined measure of change so that driver 320 can access the measure of change. Driver 320 can control a rate at which frames are displayed by controlling a rate at which image render requests are provided to graphics processor 304. Driver 320 may adjust a target frame rate based on the measure of change. Driver 320 may adjust a rate at which render requests and corresponding graphics data are made available to graphics processor 304. For example, driver 320 can adjust the target frame rate and the frame rate according to the process of FIG. 2.

Figure 4:
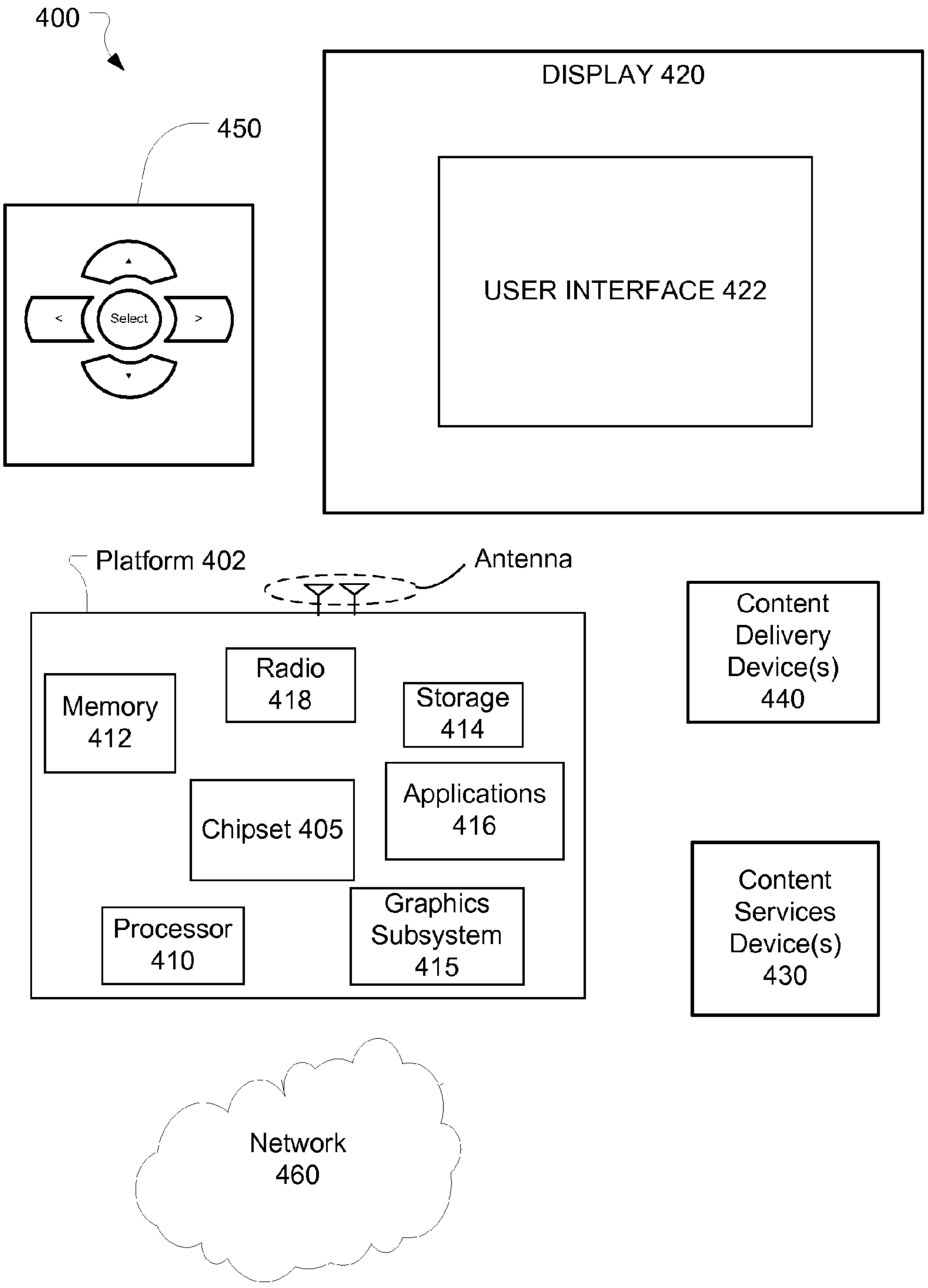
FIG. 4 illustrates an embodiment of a system.

FIG. 4 illustrates an embodiment of a system 400. In embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 400 includes a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these components is described in more detail below. In some cases, platform 402 can be communicatively to display 420 through a display interface.

In embodiments, platform 402 may include any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 410 may include single core, dual-core processors, dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 414 may include technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. Various embodiments of VPU can provide video encoding or decoding using hardware, software, and/or firmware. Various embodiments of VPU can use embodiments described herein. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 418 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In embodiments, display 420 may include any television type monitor or display. Display 420 may include, for example, a computer display screen, touch screen display, video monitor, television-like device, and/or a television. Display 420 may be digital and/or analog. In embodiments, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In embodiments, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In embodiments, content services device(s) 430 may include a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 receives content such as cable television programming including media information, digital information, and/or other content. Examples of content providers may include any cable or satellite television or radio or Internet content providers. The provided examples are not meant to limit embodiments of the invention.

In embodiments, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but integrated into platform 402 and/or display 420. Embodiments, however, are not limited to the elements or in the context shown or described herein.

In embodiments, drivers (not shown) may include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the invention.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
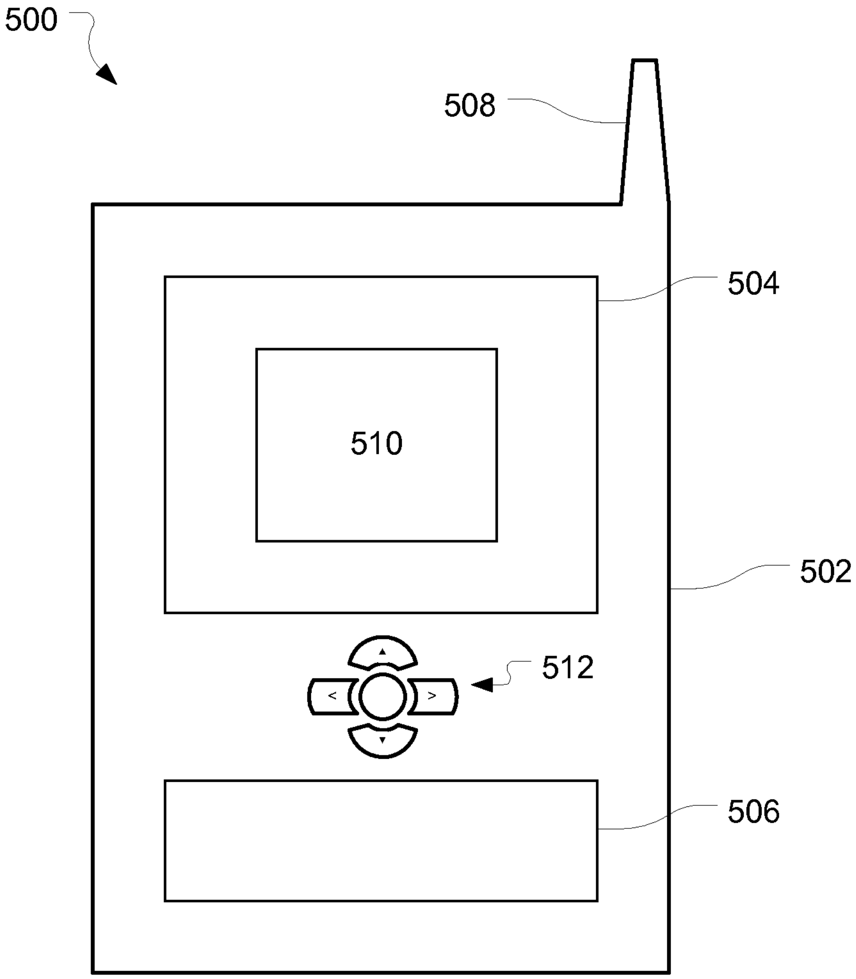
FIG. 5 illustrates embodiments of a device.

As described above, system 400 may be embodied in varying physical styles or form factors. FIG. 5 illustrates embodiments of a small form factor device 500 in which system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

FIG. 5 shows a device 500 that can use embodiments of the present invention. Device 500 includes a housing 502, a display 504, an input/output (I/O) device 506, and an antenna 508. Device 500 also may include navigation features 512. Display 504 may include any suitable display unit for displaying information appropriate for a mobile computing device. I/O device 506 may include any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term "logic" may include, by way of example, software or hardware and/or combinations of software and hardware.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although an example embodiment of the disclosed subject matter is described with reference to block and flow diagrams in the figures, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined. Specifics in the examples may be used anywhere in one or more embodiments. All optional features of the apparatus described above may also be implemented with respect to the method or process described herein.

The invention claimed is:

1. An apparatus comprising:

a graphics processor coupled to a host having a clock frequency;

a memory coupled to the graphics processor; and a detection device to determine whether a frame rate is less than a target frame rate set by a user and if so determine whether the graphics processor is I/O limited and if the graphics processor is not I/O limited to determine if the graphics processor is causing the low frame rate, and if the graphics processor is causing the low frame rate, to raise the graphics processor clock frequency and if the graphics processor is not causing the low frame rate, to raise the host clock frequency, wherein the graphics processor is I/O limited because there is a limit on the transfer rate between the memory and the graphics processor such that raising the clock frequency of the graphics processor or the host system will likely not increase the delivered frame rate.

2. The apparatus of claim 1, wherein to determine a measure of change, the detection device is to determine a Sum of Absolute Differences between at least two frames and the detection device is to cease to determine the measure of change after the Sum of Absolute Differences is higher than a threshold.

3. The apparatus of claim 1 including, said detection device to determine a measure of change between portions of at least two frames and to indicate the measure of change; and a processor configured to access the measure of change and to selectively adjust a target frame display rate at which the graphics processor is to provide one or more frames for display, where to selectively adjust, the processor is to:

set the target frame display rate to a first frame rate in response to the measure of change being the same or higher than a threshold and set the target frame display rate to a second target frame rate in response to the measure of change being less than the threshold.

4. The apparatus of claim 3, wherein the first frame rate comprises a user specified frame rate and the second frame rate comprises a frame rate that is lower than the first frame rate.

5. The apparatus of claim 3, wherein the second frame rate is to reduce power use.

6. The apparatus of claim 3, wherein the second frame rate is commensurate with the measure of change and the second frame is not to go below a floor frame rate or above a ceiling frame rate.

7. The apparatus of claim 3, wherein the detection device is to determine a measure of change in response to a current frame rate being above a threshold.

8. The apparatus of claim 3, wherein the detection device is to determine a measure of change between co-located portions of two frames.

9. The apparatus of claim 3, wherein to determine a measure of change, the detection device is to determine Sum of Absolute Differences across an integer M frames.

10. The apparatus of claim 3, wherein to determine a measure of change, the detection device is to determine a first Sum of Absolute Differences between at least two frames and determine a second Sum of Absolute Differences between sub-sets of the at least two frames and the measure of change is based at least on the first Sum of Absolute Differences and the second Sum of Absolute Differences.

11. The apparatus of claim 10, wherein the measure of change is based at least on a first weighting of the first Sum of Absolute Differences and a second weighting of the second Sum of Absolute Differences.

12. The apparatus of claim 3, wherein the processor is to:

change a frame rate to the target frame rate in response to the frame rate being different than the target frame rate.

13. The apparatus of claim 3, further comprising:

a display device communicatively coupled to the graphics processor and a wireless interface communicatively coupled to the processor.

14. A method performed using a computing device, the method comprising:

determining on a graphics processor, whether a frame rate is less than a target frame rate set by a user;

if so, determining whether the graphics processor is I/O limited;

if the graphics processor is not I/O limited, determining if the graphics processor is causing the low frame rate;

if the graphics processor is causing the low frame rate, raising the graphics processor clock frequency; and if the graphics processor is not causing the low frame rate, raising the host clock frequency, wherein the graphics processor is I/O limited because there is a limit on the transfer rate between memory and the graphics processor such that raising the clock frequency of the graphics processor or the host system will likely not increase the delivered frame rate.

15. The method of claim 14 including determining a measure of change between two or more frames and adjusting a target frame display rate, wherein the adjusting comprises:

setting the target frame display rate to a first frame rate in response to the measure of change being the same or higher than a threshold and setting the target frame display rate to a second frame rate in response to the measure of change being less than the threshold.

16. The method of claim 15, wherein the first frame rate comprises a user specified frame rate and the second frame rate comprises a frame rate that is lower than the first frame rate and the second frame rate provides for lower power use.

17. The method of claim 15, wherein the second frame rate is commensurate with the measure of change but the second frame is not to go below a floor frame rate or above a ceiling frame rate.

18. The method of claim 15, wherein the measure of change is based on a Sum of Absolute Differences across an integer M frames.

19. The method of claim 15, wherein the measure of change is based on a first Sum of Absolute Differences between at least two frames and a second Sum of Absolute Differences between sub-sets of the at least two frames.

20. The method of claim 15, further comprising:

changing a frame rate to the target frame rate in response to the frame rate being different than the target frame rate.

21. At least one non-transitory computer-readable medium storing instructions thereon, which when executed by a graphics processor, cause the graphics processor to:

determine whether a frame rate is less than a target frame rate set by a user;

if so, determine whether the graphics processor is I/O limited;

if the graphics processor is not I/O limited, determine if the graphics processor is causing the low frame rate;

if the graphics processor is causing the low frame rate, raise the graphics processor clock frequency; and if the graphics processor is not causing the low frame rate, raise the host clock frequency, wherein the graphics processor is I/O limited because there is a limit on the transfer rate between memory and the graphics processor such that raising the clock frequency of the graphics processor or the host system will likely not increase the delivered frame rate.

22. The medium of claim 21 including issuing requests to generate an image, accessing a measure of change between two or more frames, and selectively adjusting a target frame rate in response to the measure of change being less than a threshold.

23. The at least one computer-readable medium of claim 22, wherein the adjusted target frame rate is commensurate with the measure of change but the adjusted frame rate is not to go below a floor frame rate or above a ceiling frame rate.

24. The at least one computer-readable medium of claim 22, wherein the measure of change is based on a Sum of Absolute Differences across an integer M frames.

25. The at least one computer-readable medium of claim 22, wherein the measure of change is based on a first Sum of Absolute Differences between at least two frames and a second Sum of Absolute Differences between sub-sets of the at least two frames.

* * * * *